United States Patent
Van Oorschot et al.

(10) Patent No.: US 6,229,894 B1
(45) Date of Patent: May 8, 2001

(54) METHOD AND APPARATUS FOR ACCESS TO USER-SPECIFIC ENCRYPTION INFORMATION

(75) Inventors: Paul C. Van Oorschot, Ottawa; Timothy E. Moses, Kanata, both of (CA)

(73) Assignee: Entrust Technologies, Ltd., Ontario (CA)

( * ) Notice: Subject to any disclaimer, the term of this patent is extended or adjusted under 35 U.S.C. 154(b) by 0 days.

(21) Appl. No.: 08/891,999

(22) Filed: Jul. 14, 1997

(51) Int. Cl.[7] ........................................ H04L 9/32
(52) U.S. Cl. ........................ 380/21; 709/229; 713/201
(58) Field of Search ..................... 380/21, 30, 23, 380/25; 709/226, 229; 713/200, 201

(56) References Cited

U.S. PATENT DOCUMENTS

| | | | | |
|---|---|---|---|---|
| 5,163,096 | * | 11/1992 | Clark et al. ......................... 380/4 |
| 5,436,972 | * | 7/1995 | Fischer ............................... 380/25 |
| 5,481,613 | * | 1/1996 | Ford et al. .......................... 380/30 |
| 5,557,346 | * | 9/1996 | Lipner et al. ...................... 380/21 |
| 5,557,765 | * | 9/1996 | Lipner et al. ...................... 380/21 |
| 5,606,617 | * | 2/1997 | Brands ............................... 380/30 |
| 5,633,928 | * | 5/1997 | Lenstra et al. .................... 380/21 |
| 5,640,454 | * | 6/1997 | Lipner et al. ...................... 380/21 |

* cited by examiner

Primary Examiner—Gilberto Barron, Jr.
(74) Attorney, Agent, or Firm—Markison & Reckamp, PC

(57) ABSTRACT

A method and apparatus for accessing user specific encryption information is accomplished upon receiving a request for access to user specific encryption information from a requesting entity. Based on the identity of the requesting entity and/or the type of request, a server determines the requesting entity's authorized level of access to user specific encryption information. Based on the authorized level of access, the requesting entity is provided with controlled access to the user specific information.

28 Claims, 4 Drawing Sheets

METHOD AND APPARATUS FOR ACCESS TO USER-SPECIFIC ENCRYPTION INFORMATION

TECHNICAL FIELD OF THE INVENTION

This invention relates generally to encryption and more particularly to recovering. or accessing, user-specific encryption information.

BACKGROUND OF THE INVENTION

Secure transmission of data is known to include encrypting the data using an encryption algorithm and an associated encryption key. The encrypted data is then sent to a receiving party who, based on the encryption key and a corresponding decryption algorithm, decrypts the encrypted data to recapture the original data. Such an encryption algorithm and corresponding decryption algorithm may be the widely used Data encryption standard ("DES"), which utilizes a symmetric key.

An issue with the use of symmetric keys arises in getting the key securely from the sending party to the receiving party. One rather effective technique is to encrypt the symmetric key (which is sometimes referred to as a session key) using an encryption public key of the receiving party. Thus, the sending party can prepare an encrypted message by encrypting the symmetric key with the receiving party, or parties, public key and encrypting the message and/or data using the symmetric key. When the receiving party, or parties, receives the encrypted message, the receiving party decrypts the symmetric key using its private decryption key. Once the receiving party has recovered the symmetric key, it can decrypt the encrypted message and/or data. In addition, the sending party may address itself as a virtual recipient by including a copy of the symmetric key encrypted under the sending party's public key such that the sending party may subsequently access the encrypted message.

In a typical commercial application, a public-private key pair is valid for an extended period of time (E.g., one year or longer). Under the valid key pair, a user may accumulate a very large number of files (and/or e-mail messages or EDI [electronic data interchange]), each having a distinct symmetric key. If the user's private decryption key (which is sometimes referred to as a long term private key) is lost, the user is unable to decrypt any of these files and/or e-mail messages securely. To safeguard against the loss of a user's private decryption key, it is customary to store the key on a hardware token, such as a smart card or a PCMCIA Card ("PC Card"), or in a software file encrypted under an encryption key (or "pass key") derived from the user's password and other additional information.

Despite such safeguards, access to a user's private decryption key is sometimes lost (E.g., token is lost or destroyed, user forgot the password, file corruption). As such, additional safeguards have been implemented. One such implementation is to have an organization store a back-up copy of the private decryption key for each user in a secured. centralized server. Such an organization should be entitled to recover the key. For example the organization could be the users' employer. Thus, when a user loses his/her private decryption key, the user makes a request of the organization to restore his/her private decryption key. The request typically involves authentication and identification information. The organization verifies the user based on the authentication and identification information and subsequently provides, in a secure manner, the private decryption key to the user.

While the organization may provide satisfactory recovery of lost keys in the commercial setting described above, it might not adequately meet the needs of third parties, such as law enforcement agencies. The centralized organization solution fails to meet law enforcement agencies' needs because these agencies typically want to monitor, via wiretap warrants, communications of a user without notice to the user and/or the organization. Typically, the law enforcement agency will capture encrypted communications to and from a targeted user. However, without the private decryption key or session key, the law enforcement agency is unable to read the files. Thus, to obtain access to the plain text files, the organization, or the user, would have to provide the key, thus removing the anonymity of the wire-tapping.

To provide law enforcement agencies the stealth they desire while performing a wire-tap, a Key Recovery Agent (KRA) was developed and added to secure systems. A KRA is a trusted third-party which has its own private/public key pair. Each legitimate user of the secure system has a copy of the KRA's public key and uses it to encrypt a copy of the session key for the KRA, and include this in a message header, as an additional virtual recipient. If a law enforcement official then sends the header portion of the message to the KRA, the KRA is then able to recover the session key using its private decryption key. The session key may then be given to properly authorized law enforcement officials who, assuming they are also in possession of the corresponding ciphertext, can use the session key to recover the plain text message.

While the KRA works well for third-party needs to access a particular communication, it does not work well in the commercial setting where a particular user may have a hundred or more files that have been encrypted based on its public encryption key. To recover the session key for each communication, the user has to make individual requests to the KRA for the respective session keys, which is a cumbersome process. Further, the KRA does not restore the private decryption key to the user, thus, for incoming encrypted messages, the user would have to make individual requests to the KRA for the session keys of these new messages. This, obviously, is impractical for commercial use.

Therefore, a need exists for a method and apparatus that allows for controlled access of user specific encryption information that is acceptable to law enforcement agencies and is acceptable to meet the commercial requirements of the private sector.

DETAILED DESCRIPTION OF THE DRAWINGS

Generally, the present invention provides a method and apparatus for accessing user specific encryption information.

This may be accomplished upon receiving a request for access to user specific encryption information from a requesting entity. Based on the identity of the requesting entity and/or the type of request, a server determines the requesting entity's authorized level of access to user specific encryption information. Based on the level of access, the requesting entity is provided with controlled access to the user specific information. With such a method and apparatus, the present invention provides a technique for recovering lost (E.g., forgotten, destroyed, or otherwise inaccessible) private decryption keys to end-users in a commercially feasible manner and also for providing controlled access to third parties to user specific information that meets both the commercial sector's and law enforcement agencies' needs.

Figure 1:
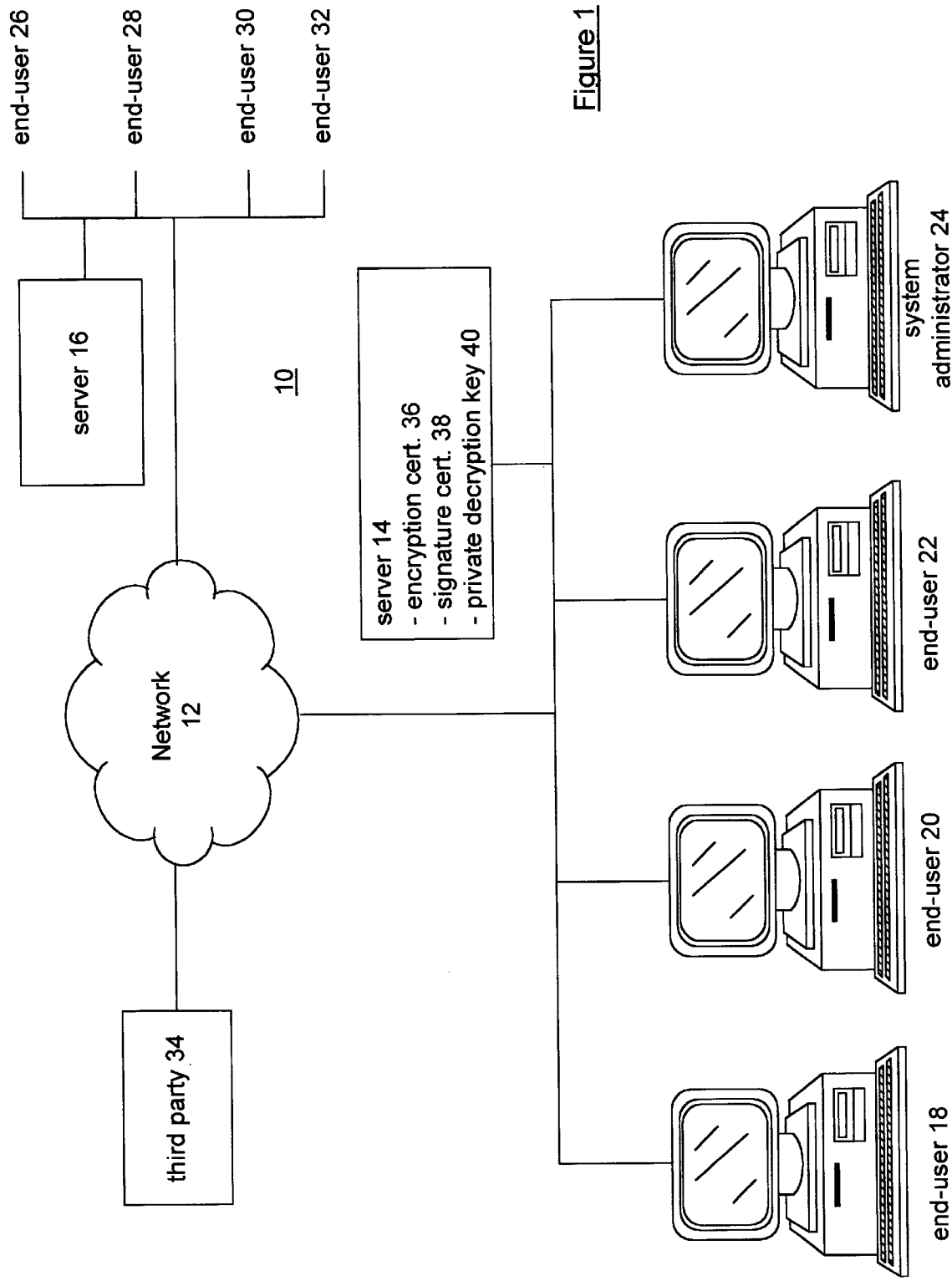
FIG. 1 illustrates a schematic block diagram of a system that incorporates the present invention.

The present invention can be more fully described with reference to FIGS. 1 through 5. FIG. 1 illustrates a schematic block diagram of a system 10 that incorporates the present invention. As shown, the system 10 includes a network 12, a first area network which may be local or wide, a second area network which may be local or wide, and a third-party 34. The first area network includes a server 14, a plurality of end-users 18–22, and a system administrator 24. The second area network includes a plurality of end-users 26–32 and a server 16. Note that the second area network may further include a system administrator. Further note that the function of the first and second area networks is substantially equivalent, thus, only one area network will be discussed. Still further note that the germane functionality of the present invention is the same regardless of whether the first and second area networks are local area networks and/or wide area networks.

As shown, the plurality of end-users 18–22 are coupled to the system administrator, the server 14, and the network 12 via the first area network. Each of the end-users 18–22 may be personal computers, main frame computers, work stations, personal digital assistants (PDA), or any device that processes digital information wherein such processing is required to be at least partially done in a secure manner. In addition, each of the end-users are equipped with at least one symmetric encryption algorithm, such as DES, and has an asymmetric public/private key pair and an asymmetric (public key) algorithm. As such, when an end-user is transmitting secured data to a receiving party, the sending party encrypts a symmetric key using the public encryption key of the receiving party, or recipient end-user. The sending end-user encrypts the message using the symmetric key and transmits the encrypted message and encrypted session key to the recipient end-users, where the recipient end-users may include the sending end-user (Note that by including the sending end-user, it allows the sender to secure locally stored files which might be done without addressing any other recipients). Upon receipt of the encrypted data, the recipient end-user utilizes its private decryption key to decrypt the session key and uses the recovered session key to decrypt the message.

The system administrator 24 may be a personal computer, a work station, a main frame computer, a network computer, or any other processing device that is capable of manipulating digital information based on programming instructions. The system administrator 24 has its own private decryption key and a public encryption key, such that it may communicate securely with any one of the end-users in the secure system 10. In operation, the system administrator 24 maintains a record of each end-user affiliated with its security domain which may be any subset of user within a local area network, wide area network, or a world-wide network. The system administrator 24 further maintains end-user information such as end-user identification, access privileges, etc. and other system information. The system administrator 24 further functions to control the addition or deletion of end-users to the security domain.

The server 14, which may be personal computer, a work station, a main frame computer, or any other processing device that is capable of manipulating digital information based on programming instructions, maintains encryption public key certificates 36, signature public key certificates 38, and private decryption keys 40 for each of the end-users in the particular secured system. The server 14 may store this information directly or within a database, which may be referred to as a directory. An encryption public key certificate includes the identity of a particular end-user, the public encryption key for the particular end-user, additional information as may be necessary, and the signature of the server. A signature key certificate includes the identity of a particular end-user, the signature verification key of this end-user, and the signature of the server. The encryption public key certificate and the signature key certificate will be discussed in greater detail with reference to FIG. 2, below.

In operation, the server 14 provides the encryption certificate 36 of an end-user(s) to a sending end-user. The sending end-user utilizes the public encryption key of the receiving end-user(s) to prepare a wrapped session key for each of the recipients, i.e., a symmetric key encrypted using the public encryption key of each receiving end-user. The sending end-user then encrypts a message and/or file using the symmetric key and transmits both the wrapped key and the encrypted message to the receiving end-user(s). Upon receipt of the encrypted message, the receiving end-user decrypts the wrapped session key using its private decryption key and then decrypts the encrypted message using the recovered symmetric key.

In addition to providing the encrypted message and wrapped key, the sending end-user may transmit its signature for this message to the receiving end-users. The receiving end-users, via the signature key certificate 38 of the sending end-user, verifies the signature of the sending party. Thus, two security services are provided; one via the public encryption and private decryption key pair and the second via the signature and verification key pair.

The server 14 also provides controlled access to user specific encryption information of each of the end-users affiliated with the security domain. For example, server 14 provides controlled access to the user specific encryption information of end-users 18–22, while server 16 provides controlled access to user specific encryption information of end-users 26–32. Such user specific encryption information includes, but is not limited to, the private decryption key, session keys for particular encrypted communications, and plain text conversion of ciphertext, i.e., the ordinary text of a file or message encrypted via a session key. As one skilled in the art will readily appreciate, the private decryption keys 40 of the end-users may be stored within the server utilizing any appropriate local encryption techniques.

The server 14 controls access to the user specific encryption information based on the identity of the requesting entity and/or the type of request. For example, the third-party 34 may request access to the private decryption key 40 for a particular end-user. If the third-party 34 is a law enforcement official authorized to wire-tap the particular end-user and requesting the private decryption key of the particular end-user, the server 14 may provide the third party with the particular end-user's private decryption key.

Alternatively, the server may restrict access to the private decryption key for a specified period, or may grant access to session keys for specific communications of the particular end-user upon presentation of the corresponding wrapped session key.

If the request from the third party was to provide plain text of ciphertext communications, the server 14 would, upon being presented with a copy of the encrypted communication including the associated wrapped session key, decrypt the communications and provide the third party with the plain text. If, however, the requesting party is the particular end-user who may have lost access to his/her own private keys, the server 14 would provide it with the private decryption key, or a history of private decryption keys and there would be no need for presenting encrypted communications along with the request. Recall that private decryption keys may be updated on a periodic basis, such as once per year. If the particular end-user has old messages, i.e., over a year old and encrypted using a different public encryption and private decryption key pair, the end-user would want to retrieve the old private decryption key such that it could decrypt old messages. Thus, a history of private decryption keys may be provided. As one skilled in the art will readily appreciate, the controlled access provided by the server 14 will depend on local, state, and federal laws, agreements the system administrator has with local governmental agencies, agreements with the end-users, etc.

Figure 2:
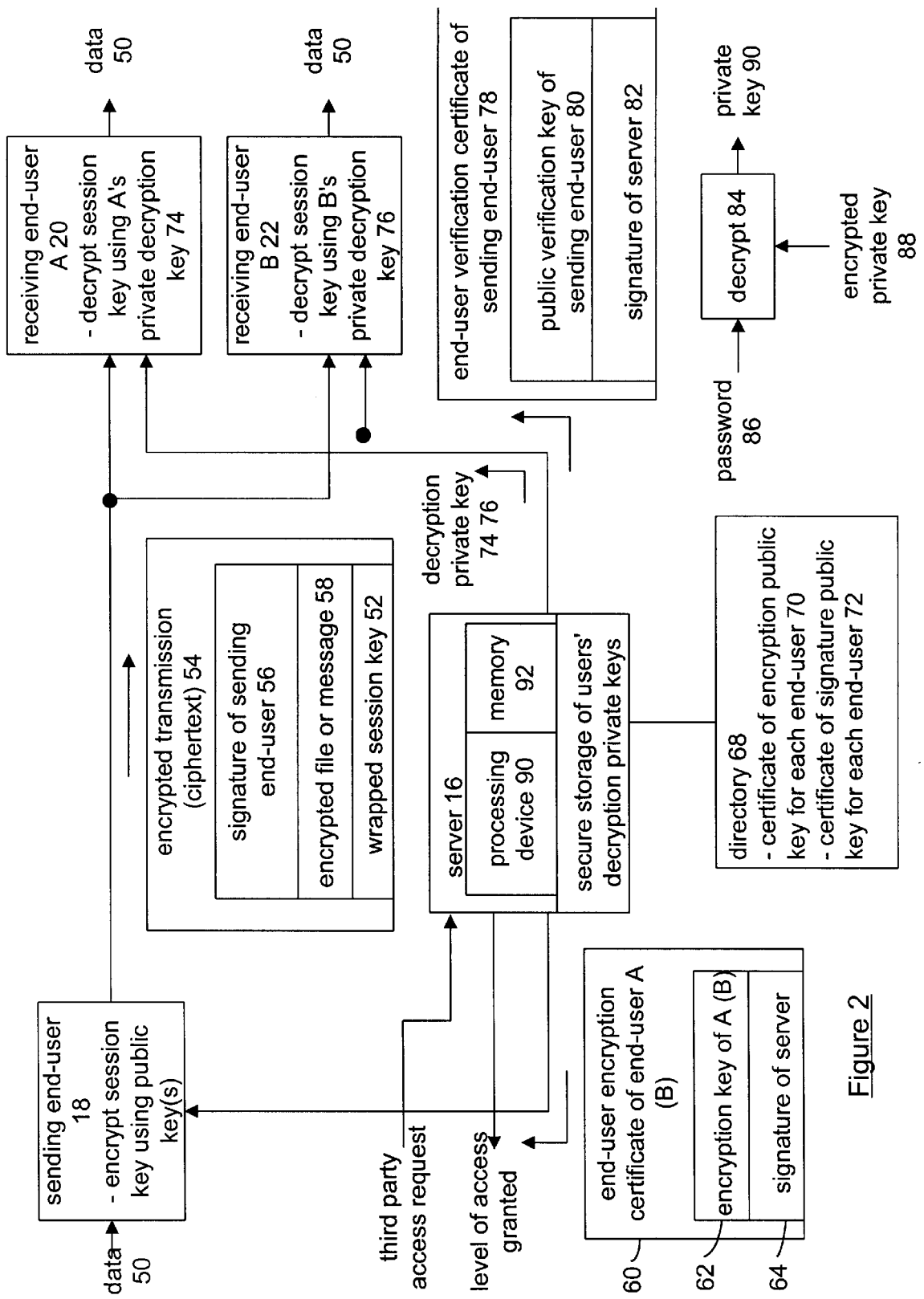
FIG. 2 illustrates a graphical representation of encrypted data flow which is in accordance with the present invention.

FIG. 2 illustrates a graphical representation of encrypted data flow in the secure system of FIG. 1. In this example, the sending end-user 18 desires to encrypt data 50 and provide it to end-users A 20 and B 22. To begin the encryption process the sending end-user 18 requests, and subsequently receives, an end-user encryption certificate of end-users and another one for end-user B from server 16. The end-user encryption certificate of end-user A or B 60 includes the public encryption key of the particular end-user 62, the end-user's identity, and the signature of the server 64 on this certificate data.

Upon receiving this information, the sending end-user 18 verifies the signature of the server 64. Such a verification is done using a verification algorithm and the public key of the server. Once the signature of the server has been verified to be valid, the sending end-user 18 knows that the public encryption keys 62 for end-users A and/or B are valid. Having valid public encryption keys for the targeted end-users A and B, the sending end-user 18 generates and encrypts a symmetric key based on the public encryption keys of end-users A and B to produce two wrapped session keys. A wrapped session key is also created using the encryption public key of the sending end-user 18, for reasons as explained below. As one skilled in the art will readily appreciate, the sending end-user 18 needs to generate a unique wrapped session key for each of the receiving end-users, but only one copy of the encrypted file or message 58 will only be encrypted using the symmetric key.

Having generated the wrapped session keys 52 and the encrypted file or message 58, the sending end-user 18 includes its signature 56 in an encrypted transmission 54 and transmits it to the receiving end-users 20 and 22. Note a copy of the session key is also wrapped under the encryption public key of the sending end-user 18. This is done for several reasons: One of which enables the sending end-user 18 to keep a record of the encryption transmissions 54 that it generates. Another reason is for the law enforcement agencies. If the sending end-user 18 did not make a wrapped key for itself a requesting third party 34 making a request regarding an end-user 18, associated with server 14, would only be able to access inbound transmissions, since they are encrypted with the receiving end-users' public encryption key and the third party might only have access to the server 14 of the sending unit 18. But outgoing message are encrypted using the public encryption key of the receiving end-users, thus, by including the sending end-user as a receiving end-user, a third party 34 making a request on the server 14, to which end-user 18 is affiliated, would be able to access outbound transmissions of the sending end-user 18.

Upon receiving the encrypted transmission, each of the receiving end-users 20 and 22 retrieves their respective private decryption keys 74 and 76. The end-users 20 and 22 typically will store their own private decryption keys either in a hardware format or a software format. If an end-user has lost its private decryption key, it may retrieve it from the server 16. As mentioned, the server 16 may store the private decryption keys 74 and 76 in secure hardware, or in software using an encryption algorithm and a local cryptographic key of the server 16.

Having retrieved their private decryption keys 74 and 76, the receiving end-users 20 and 22 decrypt the wrapped session key 52 to recapture the symmetric key. Having recaptured the symmetric key, the receiving end-users 20 and 22 decrypt the encrypted file or message 58. As one skilled in the art will readily appreciate, the communication of the encrypted transmission 54 may be done over an online protocol or using a store-and-forward communication protocol. An online protocol is one that has a low-latency bi-directional connection between the sending end-user and the receiving end-users, while a store-and-forward communication protocol does not have a bi-directional connection between the sending and receiving end-users and the latency may be high If the end-users desire to verify the signature of the sending end-user 56. The receiving end-users 20 and 22 further receive an end-user verification certificate 78. Note that this certificate 78 may be appended to the encrypted message by the sending end-user or it may be retrieved from the directory (as shown in FIG. 2) by each recipient end-user. The end-user verification certificate includes end-user identity, a public verification key of the sending end-user 80 and the signature of the server 82. Upon verifying the signature of server 82, the receiving end-users 20 and 22 know that the public verification key of sending end-user 80 is authentic. Having the public verification key of the sending end-user, the signature of the sending end-user 56 may be verified.

As is further shown in FIG. 2, the server 16 is coupled to a directory 68. The directory 68 may be a data base which stores the end-user encryption certificates 70 (and, optionally, end-user signature certificates 72) for each of the plurality of end-users in the secure system 10. An end-user encryption certificate 60 includes the public encryption key 62 of one end-user and the signature of the server 64. The end-user verification certificate 78 includes a public signature verification key 80 for one end-user and the signature of the server 82. As previously mentioned, the private decryption key and the private signature key of an end-user is updated on a periodic basis (E.g. once per year). As such, the end-user encryption certificate 60 and the end-user verification certificate 78 must be updated as well.

To update the end-user encryption certificate 60, the end-user system first determines that it is time to update its encryption certificate. Having made this determination, the end-user provides a decryption key update request to the server. Upon receiving the request, the server generates a new private decryption key and a public encryption key for the requesting end-user. Alternatively, the end-user system may generate the encryption key pair and securely transmit the decryption private key and the encryption public key to the server. The server 16 then securely provides the new private decryption key to the end-user. Next, the server 16 generates and publishes the new public encryption key in the directory as an updated end-user encryption certificate.

When updating the end-user signature certificate for a particular end-user, the end-user system generates a new signature key pair and provides the public key (i.e., the signature verification key) to the server. The server 16 then generates the signature verification certificate, which includes the new verification public key of the requesting end-user.

Figure 3:
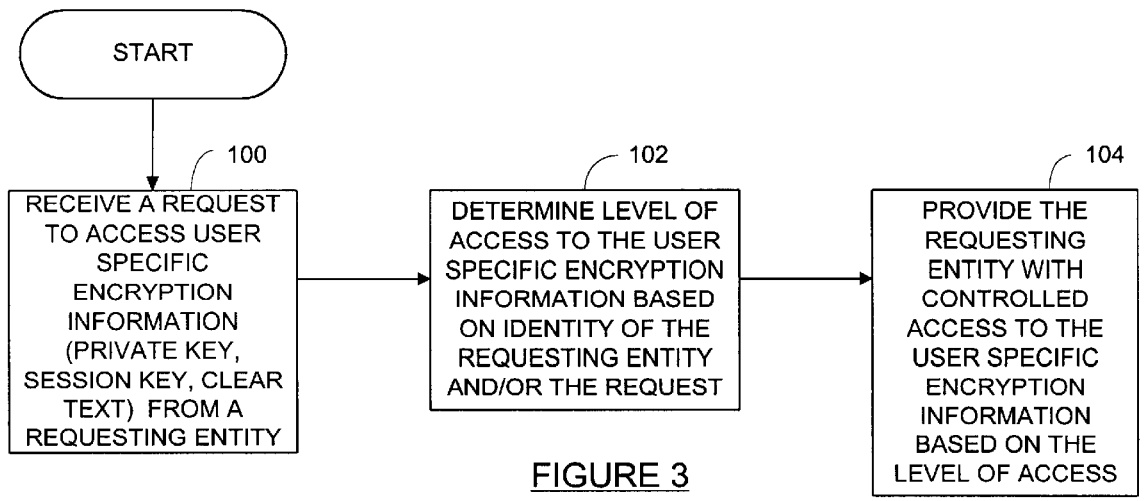
FIG. 3 illustrates a logic diagram which may be used to access user-specific encryption information in accordance with the present invention.
Figure 4:
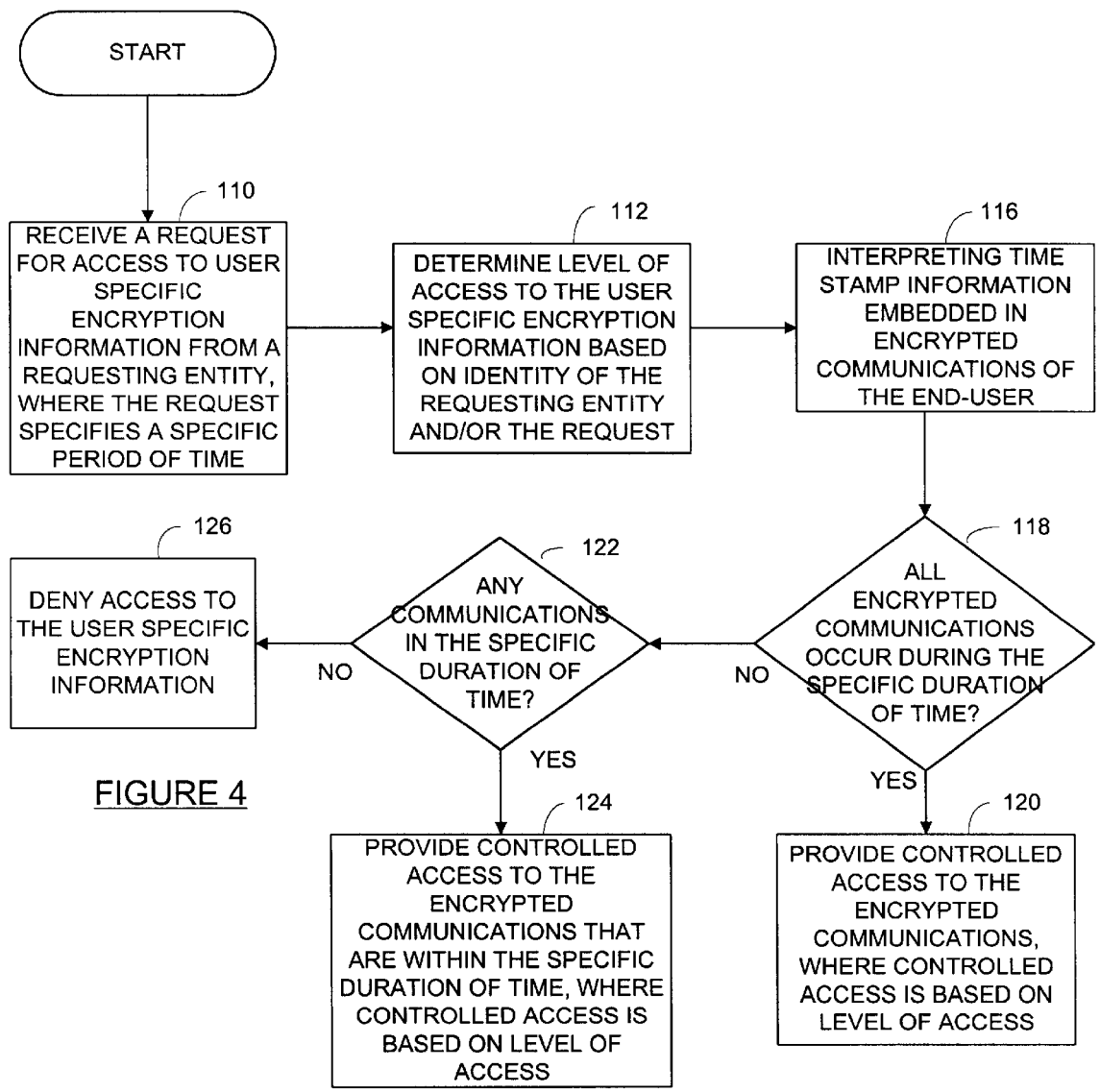
FIG. 4 illustrates a logic diagram which may be used to access user specific encryption information in accordance with the present invention.
Figure 5:
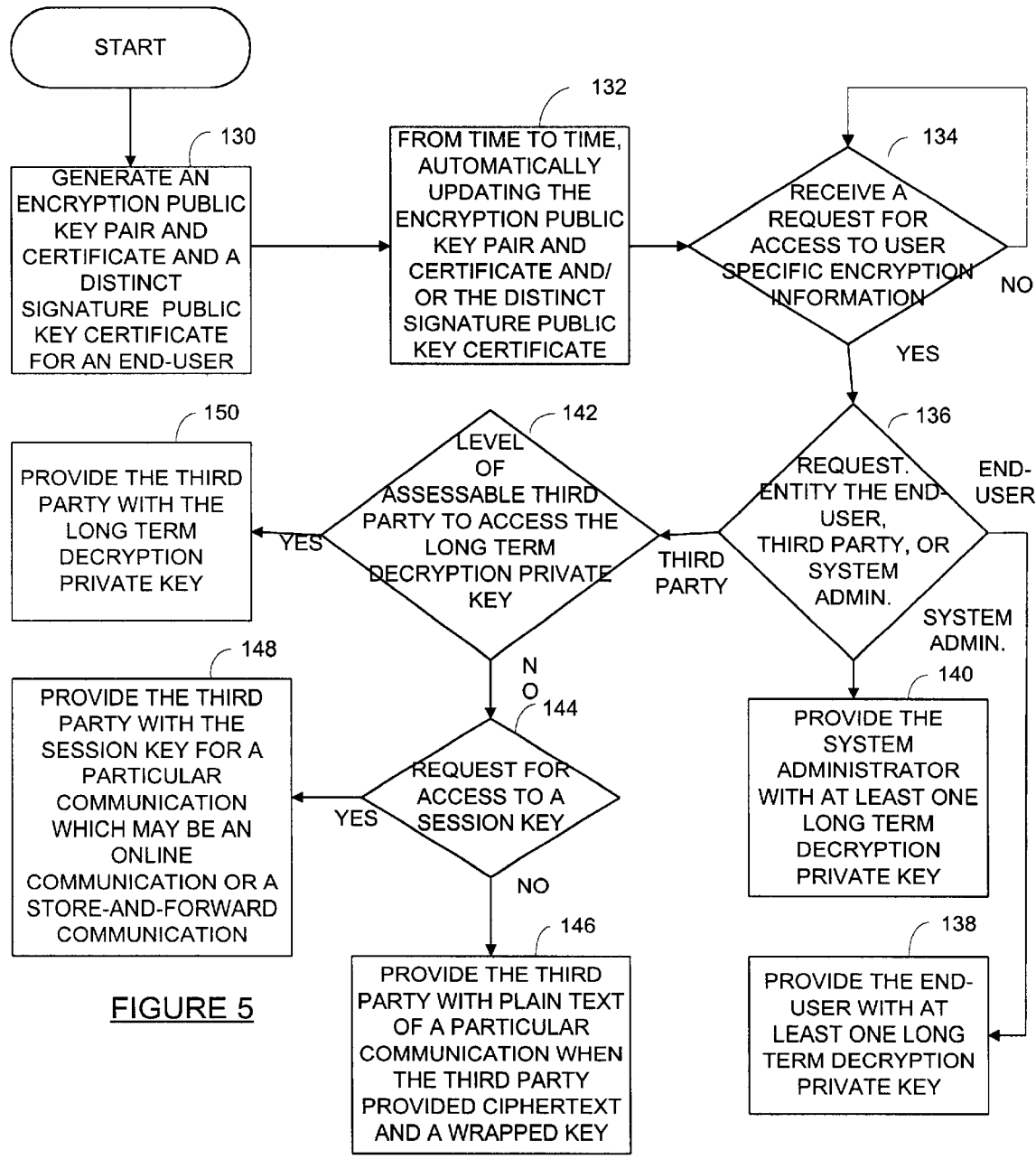
FIG. 5 illustrates a logic diagram which may be used to access user specific encryption information in accordance with the present invention.

If the server 16 receives a request for access to user specific encryption information from a requesting entity, the server 16, via a processing device 90 (and, optionally, with the assistance of a human operator acting at a server user interface), would execute programming instructions stored in memory 92; such programming instructions may be for any one, or all, of the processes illustrated in FIGS. 3 through 5. The processing device 90 may be a micro-computer, micro-controller, micro-processor, personal computer, work station, or any device that manipulates digital information based on programming instructions. The memory may be RAM, ROM, CD ROM, hard drive, floppy disk, and magnetic tape memory, or any means for storing digital information Upon receiving the request, the server 16 would determine the identity of the requesting entity and the type of access being requested. From this information, the server 16 would determine the requesting entity's authorized level of access to the user specific encryption information and provide the requesting entity with controlled access to the encryption information based on the authorized level of access. For example, if the requesting entity is the end-user, the server 16, upon verifying the end-user's identity, would provide the end-user system with the end-user's own private decryption key or a history of decryption keys.

As an alternative example, if the requesting entity is a third party, the server 16 would determine whether the particular third party has any access rights to the user specific encryption information. If not, the server would deny the third party's request. If, however, the third party does have access privileges to the user specific encryption information, the server would determine to what degree. For example, the third party may be granted access to the end-user's private decryption key or key history such that it can decrypt any messages received by or transmitted by the end-user at any point in the past or until the next key update. Alternatively, access to the end-user's private decryption key may be limited to a specific period of time. As another alternative, the third party may be granted access to certain session keys for particular communications. As yet another alternative, the third party may be granted access, not to keying material but rather to the plain text corresponding to ciphertext (accompanied by the appropriate wrapped session keys) which the third party provided.

The lower-right portion of FIG. 2 illustrates the software process of retrieving an end-user's private decryption key 90 using a decryption process 84 which utilizes a password 86 to decrypt an encrypted private decryption key 88. The encrypted private key 88 may be the decryption private key 74, 76, provided by server 16. If the end-user forgets his or her password or its record of the private key becomes lost or destroyed, then the user's copy of the private decryption key 90 is lost. Once the private key is lost the user is no longer able to decrypt stored or incoming messages. This, therefore, provides a need for the present invention, which allows the end-user to recover its private decryption keys.

FIG. 3 illustrates a logic diagram which may be used to request access to user specific encryption information. The process begins at step 100 where a request to access user-specific encryption information is received from a requesting entity. The request may be requesting access to the user-specific encryption information such as a private decryption key of a particular end-user, a session key for a particular communication, or clear text from captured ciphertext, while the requesting entity may be a third-party, the particular end-user, or the system administrator. Note that a third-party, which may be a law enforcement agency, is not affiliated with the secure system in that it is not involved in the normal operations of the system nor is it an end-user or the system administrator.

Upon receiving the request to access user-specific encryption information, the process proceeds to step 102 where a determination is made as to the authorized level of access the requesting entity has to the information. Such a determination is based on the identity of the requesting entity and/or the details/contents of the request. For example, if the requesting entity is the end-user and the request is to recover its private decryption key history, the server would grant the request. Alternatively, when the requesting entity is a third-party, the request may be to access the private key, access a particular session key for a particular communication, or to obtain clear text of a ciphertext document. Depending on whether the third party has authorization for such a request, the server may or may not grant the request. As one skilled in the art will readily appreciate, the granting of a request and the resulting level of access provided by the server 14 will depend on local, state, and federal laws, agreements the system administrator has with local governmental agencies, agreements with the end-users, etc.

Having determined the level of access, the process proceeds to step 104 where the requesting entity is provided with controlled access to the user's specific encryption information. Such controlled access limits the requesting entity's access to the user-specific encryption information. For example, if the requesting entity is a third-party, the requesting entity might not be provided with the private decryption key but only a session key for a particular communication that fell within a particular time period. By limiting the access of third parties to user specific encryption information, the commercial sector's need for limiting third-party's access to sensitive data is obtained. In addition a third-party's need to obtain access to particular information (E.g., in accordance with a legal warrant) is achieved. Thus, the present invention provides a method and apparatus that substantially meet the needs of both governmental agencies and the private sector regarding secured data transmissions. Moreover, this need is met without the introduction of additional infrastructure, such as a third party KRA, which introduces additional business costs and complexities.

FIG. 4 illustrates a logic diagram that may be used to obtain access to user specific encryption information. The process begins at step 110 where a request for access to user-specific encryption information is received from a requesting entity. The requests, in addition to specifying the identity of the requesting entity and the type of request, also specifies a specific duration of time that access to the user-specific encryption information is being requested.

Upon receiving the request, the process proceeds to step 112 where a determination is made as to the requesting entity's level of access to the user specific encryption information. Such a determination is based on the identity of the requesting entity and/or the particular request.

Having made such a determination, the process proceeds to step 116 where time-stamped information embedded in encrypted communication of the end-user is interpreted. This step assumes that encrypted communications include time-stamped information. As is generally understood in the art, reliable time stamping of information is dependent on an accurate clock source and that the time stamp be embedded in the communication in a trustworthy manner, i.e., one which precludes subsequent manipulation or modification by an unauthorized party. Thus, the secure system 10 would require access to an accurate clock source such as the global positioning satellite system or a dedicated clock for the system.

Having interpreted time-stamped information, the process proceeds to step 118 where a determination is made as to whether all the encrypted communications being requested occurred during the specific duration of time. If yes, the process proceeds to step 120 where controlled access is provided to the encrypted communications, where such controlled access is based on the level of access.

If, however, all of the communications do not occur within the specific period of time, the process proceeds to step 122. At step 122, a determination is made as to whether any of the communications occurred within the specific time duration. If not, the process proceeds to step 126 where access is denied to the user specific encryption information. If, however, some of the communications occurred within the specific period of time, the process proceeds to step 124. At step 124, controlled access is provided to the encryption communications that are within the specific period of time. Such control access is based on the authorized level of access. As one skilled in the art will readily appreciate, a third-party, such as a law enforcement official may request access to a particular end-user's encrypted communications that will occur in the future. Such a future requests, which are typically obtained via a warrant, would indicate the particular specific period of time. The process of FIG. 4 would accommodate such future communications by providing the appropriate wrapped session keys.

FIG. 5 illustrates a logic diagram for obtaining access to user specific encryption information. The process begins at step 130 where the server generates an encryption public/private key pair, a public key certificate, and a distinct signature public key certificate for at least one end-user. Such encryption public key certificates and signature public key certificates were discussed previously with reference to FIG. 2. The process then proceeds to step 132 where, from time to time, the server automatically updates and securely transmits to the user, either by online or store-and-forward communication, the encryption public key pair, the distinct public key certificate, and/or the distinct signature public key certificate. This too was discussed with reference to FIG. 2.

The process then proceeds to step 134 where a determination is made as to whether a request for access to user-specific encryption information has been received. If not, the process waits until such a request is received. Once a request is received, the process proceeds to step 136 where a determination is made as to whether the requesting entity is the end-user, a third-party, or the system administrator.

If the requesting entity is the end-user, the process proceeds to step 138 where the end-user is provided with at least one long-term private decryption key. The end-user may further be provided with a history of long-term private decryption keys such that, if the user has stored encrypted messages that pre-date the current decryption private key, the user may decrypt such old messages. If, the requesting entity is the system administrator, the process proceeds to step 140. At step 140, the system administrator is provided with access to at least one long-term decryption private key of the end-user. Similarly, the system administrator may be provided with a history of decryption private keys for the end-user.

If, however, the requesting entity is a third-party, the process proceeds to step 142 where a determination is made as to whether the level of access of the third-party enables the third-party to access the long-term decryption private key. If so, the process proceeds to step 150 where the third-party is provided with access to the long-term decryption private key. As one skilled in the art will readily appreciate, when the third-party has the long-term decryption private key, the third-party may decrypt any communication using a session key that was wrapped using the public key associated with the private key. To allow decryption of information transmitted from the end-user, the end-user system is designed to include a wrapped session key for itself such that it is a recipient of its encrypted messages. This is reflected in FIG. 2.

If, however, the third-party is not allowed to access the long-term decryption private key, the process proceeds to step 144 where a determination is made as to whether the request is requesting access to a session key. If yes and such access is authorized, the process proceeds to step 148 where the third-party is provided with access to the session key for a particular communication where the ciphertext (or simply the wrapped key) corresponding to this communication is provided by the third party to the server. Such a particular communication may be an online communication or a store-and-forward communication. If, however, the request was not for access to a session key but for decryption of ciphertext, the process proceeds to step 146. At step 146, if such a request by this third party is authorized, the third-party is provided with plain text of a particular communication when the third-party has provided ciphertext and a wrapped key for the particular communication.

The preceding discussion has presented a method and apparatus for a secure system to substantially meet the needs of the private sector and third parties, such as governmental agencies. By controlling access to user-specific encryption information, third-party entities, which may be law enforcement officials, can obtain authorized access to encrypted data of a particular end-user while the private sector can be assured that the third-party access is limited and within the controls of a commercial organization as authorized by a legal warrant. In addition, the third-party may obtain access to the user-specific encryption information only from a specific period of time, where requests for access to communications outside the period of time will be denied by the server of the secured system. Further, the present invention allows end-users to restore their private decryption keys and/or key histories without the burdens of the KRA system.

What is claimed is:

1. In a secure system that includes a server and a plurality of end-users, wherein the server stores a copy of long term decryption private keys for each of the plurality of end-users, a method for the server to process a request for access to user specific encryption information of one of the plurality of end-users, the method comprises the steps:

a) receiving, from a requesting entity, a request for access to the user specific encryption information, wherein the requesting entity includes at least one of: one of the plurality of end-users, a system administrator of the secure system, and a third party not affiliated with the secure system;

b) determining authorized level of access of the requesting entity to the user specific encryption information based on at least one of identity of the requesting entity and the request; and c) providing the requesting entity with controlled access to the user specific encryption information based on the authorized level of access.

2. The method for claim 1 further comprises:

generating an encryption public key certificate and a distinct signature public key certificate for an end-user of the plurality of users;

storing, by the server, the long term decryption private key corresponding to the encryption public key certificate of the end-user; and automatically, from time to time, updating the encryption public key certificate and, independently over time, the distinct signature public key certificate.

3. The method of claim 1, wherein, when the requesting entity is the one of the plurality end-users, step (b) further comprises determining the level of access of the one of the plurality of end-users to be receipt of at least one long term decryption key; and wherein step (c) further comprises providing the at least one long term decryption private key to the one of the plurality of end-users.

4. The method of claim 1, wherein, when the requesting entity is the system administrator of the secure system, step (b) further comprises determining the level of access of the system administrator to be receipt of at least one long term description key, and wherein step (c) further comprises providing the at least one long term decryption private key to at least one of: the one of the plurality of end-users and the system administrator.

5. The method of claim 1, wherein, when the requesting entity is the third party not affiliated with the secure system, step (b) further comprises determining the level of access of the third party to be receipt of at least one long term decryption key of the one of the plurality of end-users; and wherein step (c) further comprises providing the long term decryption private key of the one of the plurality of end-users users, wherein the providing is done via at least one of an online communication and a store-and-forward communication.

6. The method of claim 1, wherein, when the requesting entity is the third party not affiliated with the secure system, step (b) further comprises determining the level of access of the third party to be receipt of a session key of a particular communication of the one of the plurality of end-users; and wherein step (c) further comprises providing the session key of a particular communication of the one of the plurality of end-users, wherein the particular communication is at least one of an online communication and a store-and-forward communication.

7. The method of claim 6 further comprises:

providing a symmetric key encrypted using a public key of the one of the plurality of end-users as the session key, wherein the symmetric key is provided to the requesting entity as at least one of: clear symmetric key, encrypted session key using a public key of the requesting entity, and encrypted using a unique symmetric key that is known by the server and the requesting entity.

8. The method of claim 1, wherein, when the requesting entity is the third party not affiliated with the secure system, step (b) further comprises determining the level of access of the third party to be receipt of plain text of a particular communication of the one of the plurality of end-users; and wherein step (c) further comprises providing the plain text of a particular communication of the one of the plurality of end-users when the third party provided ciphertext with a wrapped key, wherein the providing is done via at least one of an online communication and a store-and-forward communication.

9. The method of claim 1 further comprises:

receiving the request from a third party, wherein the request is requesting the user specific encryption information for a specific period of time;

interpreting time stamp information that has been embedded in encrypted communications of the one of the plurality of end-users; and providing the third party with the controlled access to the user specific encryption information for encrypted communications that occur within the specific period of time.

10. In a secure system that includes a server and a plurality of end-users, wherein the server stores a copy of long term decryption private keys for each of the plurality of end-users, a method for the server to recover user specific encrypted information of one of the plurality of end-users, the method comprises the steps of:

a) receiving, from a requesting entity, a request for recovery of the user specific encrypted information, wherein the request is requesting the user specific encryption information for a specific period of time, and wherein the requesting entity includes at least one of: one of the plurality of end-users, a system administrator of the secure system, and a third party not affiliated with the secure system;

b) determining authorized level of access to the user specific encrypted information based on at least one of: identity of the requesting entity and the request;

c) interpreting time stamp information that has been embedded in encrypted communications of the one of the plurality of end-users; and d) providing the requesting entity controlled access to the user specific encryption information for encrypted communications that occur within the specific period of time, wherein the controlled access is based on the authorized level of access.

11. The method of claim 10 further comprises providing a session key for at least one of the encrypted communications that occurred within the specific period of time.

12. The method of claim 10 further comprises providing plain text of at least one of the encrypted communications that occurred within the specific period of time when the requesting entity has provided a ciphertext version and a wrapped key of the at least one of the encrypted communications.

13. A server comprising:

a processing device;

first memory for storing a copy of long term decryption private keys for each of a plurality of end-users; and second memory that stores programming instructions that, when read by the processing device, causes the processing device to (a) receive, from a requesting entity, a request for access to the user specific encryption information, wherein the requesting entity includes at least one of: one of the plurality of end-users, a system administrator of the secure system, and a third party not affiliated with the secure system; (b) determine authorized level of access of the requesting entity to the user specific encryption information based on at least one of identity of the requesting entity and the request; and (c) provide the requesting entity with controlled access to the user specific encryption information based on the authorized level of access.

14. The server of claim 13 further comprises, within the memory, programming instructions that, when read by the processing device, causes the processing device to provide at least one long term decryption private key to the one of the plurality of end-users when the requesting entity is the one of the plurality end-users.

15. The server of claim 13 further comprises, within the memory, programming instructions that, when read by the processing device, causes the processing device to provide a long term decryption private key of the one of the plurality of end-users when the requesting entity is a third party not affiliated with the secure system.

16. The server of claim 13 further comprises, within the memory, programming instructions that, when read by the processing device, causes the processing device to provide a session key of a particular communication of the one of the plurality of end-users when the requesting entity is a third party not affiliated with the secure system.

17. The server of claim 16 further comprises, within the memory, programming instructions that, when read by the processing device, causes the processing device to provide a symmetric key encrypted under a public key of the one of the plurality of end-users as the session key, wherein the symmetric key is provided to the requesting entity as at least one of: clear symmetric key, encrypted session key using a public key of the requesting entity, and encrypted using a unique symmetric key that is known by the server and the requesting entity.

18. The server of claim 13 further comprises, within the memory, programming instructions that, when read by the processing device, causes the processing device to provide plain text of a particular communication of the one of the plurality of end-users when the requesting entity is a third party not affiliated with the secure system when the requesting entity has provided ciphertext with a wrapped key.

19. The server of claim 13 further comprises, within the memory, programming instructions that, when read by the processing device, causes the processing device to:
receive the request from a third party, wherein the request is requesting the user specific encryption information for a specific duration of time;
interpret time stamp information that has been embedded in encrypted communications of the one of the plurality of end-users; and
provide the third party with the controlled access to the user specific encryption information for encrypted communications that occur within the specific duration of time.

20. The server of claim 13 further comprises, within the memory, programming instructions that, when read by the processing device, causes the processing device to generate an encryption public key certificate and a distinct signature public key certificate for an end-user of the plurality of users, and automatically, from time to time, update the encryption public key certificate and the distinct signature public key certificate.

21. The server of claim 13 further comprises, within the memory, programming instructions that, when read by the processing device, causes the processing device to provide a long term decryption private key of the one of the plurality of end-users when the requesting entity is a system administrator.

22. A digital storage medium that stores programming instructions that, when read by a processing device, causes the processing device to recover user specific encrypted information in a secure system, the digital storage medium comprises:
first means for storing programming instructions that, when read by the processing device, causes the processing device to receive, from a requesting entity, a request for access to the user specific encrypted information, wherein the requesting entity includes at least one of: one of the plurality of end-users, a system administrator of the secure system, and a third party not affiliated with the secure system;
second means for storing programming instructions that, when read by the processing device, causes the processing device to determine authorized level of access of the requesting entity to the user specific encryption information based on at least one of identity of the requesting entity and the request; and
third means for storing programming instructions that, when read by the processing device, causes the processing device to provide the requesting entity with controlled access to the user specific encryption information based on the authorized level of access.

23. The digital storage medium of claim 22 further comprises programming instructions that, when read by the processing device, causes the processing device to provide at least one long term decryption private key to the one of the plurality of end-users when the requesting entity is the one of the plurality end-users.

24. The digital storage medium of claim 22 further comprises programming instructions that, when read by the processing device, causes the processing device to provide a long term decryption private key of the one of the plurality of end-users when the requesting entity is a third party not affiliated with the secure system.

25. The digital storage medium of claim 22 further comprises programming instructions that, when read by the processing device, causes the processing device to provide a session key of a particular communication of the one of the plurality of end-users when the requesting entity is a third party not affiliated with the secure system.

26. The digital storage medium of claim 25 further comprises programming instructions that, when read by the processing device, causes the processing device to provide a symmetric key encrypted under a public key of the one of the plurality of end-users as the session key.

27. The digital storage medium of claim 22 further comprises programming instructions that, when read by the processing device, causes the processing device to provide plain text of a particular communication of the one of the plurality of end-users when the requesting entity is a third party not affiliated with the secure system and when the requesting entity has provided ciphertext.

28. The digital storage medium of claim 22 further comprises programming instructions that, when read by the processing device, causes the processing device to:
receive the request from a third party, wherein the request is requesting the user specific encryption information for a specific duration of time;
interpret time stamp information that has been embedded in encrypted communications of the one of the plurality of end-users; and
provide the third party with the controlled access to the user specific encryption information for encrypted communications that occur within the specific duration of time.

* * * * *